UNITED STATES PATENT OFFICE.

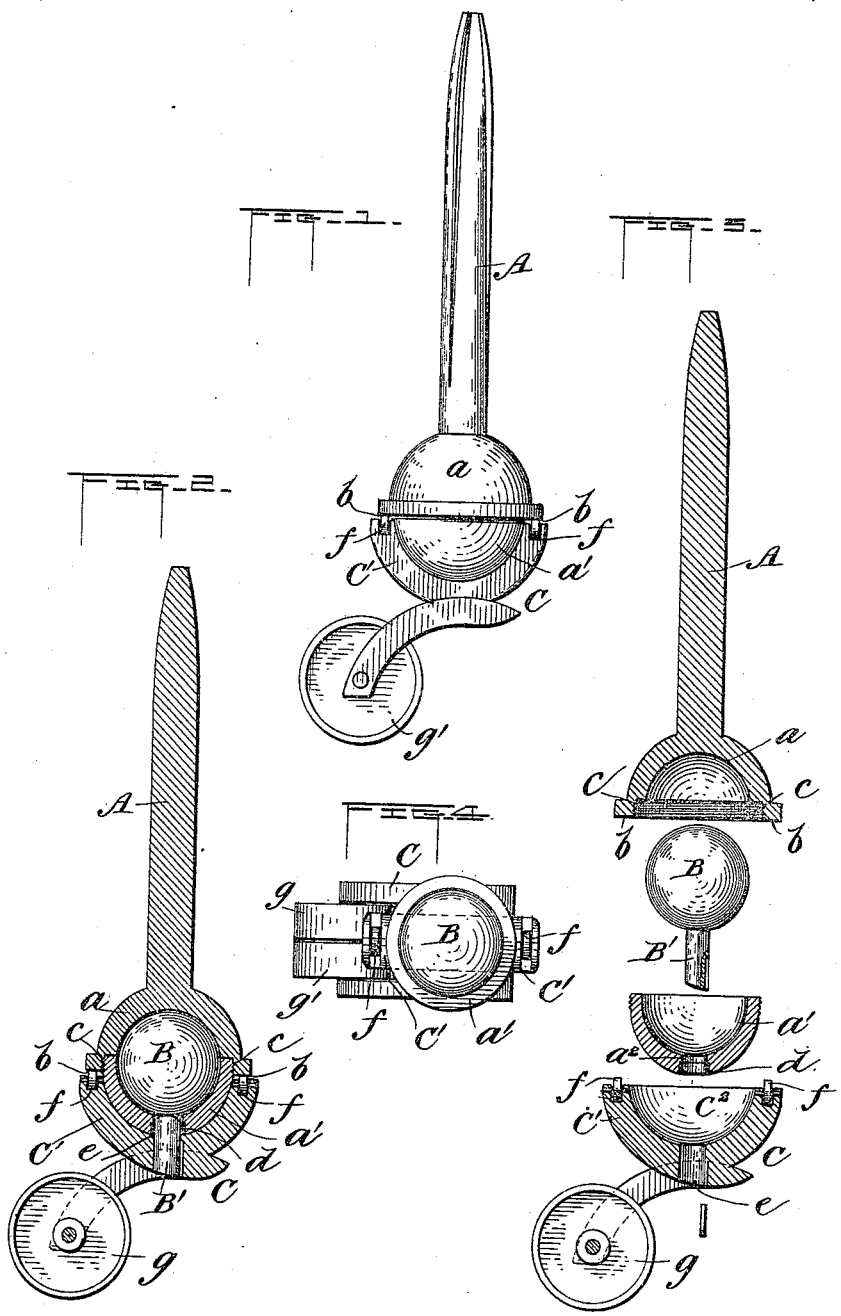

WILLIAM IMBT, OF ANALOMINK, PENNSYLVANIA.

FURNITURE-CASTER.

SPECIFICATION forming part of Letters Patent No. 465,986, dated December 29, 1891.

Application filed July 15, 1891. Serial No. 399,581. (No model.)

*To all whom it may concern:*

Be it known that I, WILLIAM IMBT, a citizen of the United States, residing at Analomink, in the county of Monroe and State of Pennsylvania, have invented certain new and useful Improvements in Furniture-Casters; and I do hereby declare the following to be a full, clear, and exact description of the invention, such as will enable others skilled in the art to which it appertains to make and use the same.

My invention consists in a caster comprising two semi-spherical bearing portions (one of which is perforated) for inclosing a ball having a stem, and a caster-bracket having a concave bearing portion which is centrally perforated, and into which perforation the stem of the ball fits and is keyed to the last-mentioned bearing portion.

It also consists in providing a bearing-flange on the upper section of the bearing which incloses the ball, in combination with friction rollers or balls applied to the concave bearing of the caster-bracket; and it further consists in uniting the two parts which inclose the ball by means of a screw-thread, all as will be hereinafter described and specifically claimed.

In the accompanying drawings, Figure 1 is a side elevation of my improved caster, and Fig. 2 is a vertical section of the same. Figs. 3 are detail views of all the parts arranged to be fitted together as in actual practice, and Fig. 4 is a top view of the lower section of the caster and ball.

In the accompanying drawings, A represents the fastening-shank of the caster-bearing. At the bottom of this shank a hollow semi-spherical bearing portion or section $a$ is provided, and at the lower edge of this portion a horizontal bearing-ledge $b$, of greater diameter than the portion itself, is provided. On the inside of this portion a rabbet-shoulder $c$, with a screw-thread formed in its vertical wall, is cut or formed. In conjunction with the portion $a$, another half-hollow semi-spherical portion $a'$ is employed, the same being provided with a screw-thread at its upper edge and connected by said thread with the portion $a$. The portion $a'$ is centrally perforated by a circular passage $a^2$, and this central passage is provided with a brass bushing $d$, if found desirable.

B is a ball provided with a vertical stem B'. This ball is applied within the portions $a$ and $a'$, before the parts are screwed together, by passing the stem down through the central perforation $a^2$.

C is the caster-bracket. Its upper portion C' is made with a concaved surface $C^2$, corresponding to the outer surface of the portion $a'$ and serving as a seat for said portion to fit into, as illustrated in the drawings. The said concaved portion is centrally perforated coincidingly with the perforation in the portion $a'$, as indicated at $e$, and through this perforation the stem of the ball is passed and secured by means of a key, so that the ball is rigidly connected with the caster-bracket, and whatever movements are made by the caster-bracket shall be made by the ball within its bearing portions $a$ $a'$. The concave portion C' may be in the form of two narrow arms, as illustrated in Figs. 1 and 4, or its inside surface may be a complete half of a hollow sphere. The upper edge of this concave portion is provided with friction-rollers $f$, and these rollers bear against the under surface of the ledge of the portion $a$ of the ball-bearing, as illustrated. The rollers are secured in position by means of axial pins, and if balls should be employed the same would be secured by perforated capping-pieces fastened to the portion C'.

It will be seen from the foregoing description that the weight of the piece of furniture to which the caster is attached comes upon the ball and the friction-rollers, and thus relieves the screw-thread connection of the ball-bearing from injurious strain. It will also be seen that the ball turns with the caster within its spherical bearing, and that in the event of any arrest or chocking of the caster the ball-bearing will move around on the ball and the friction-rollers, and thus a very perfect movement of both the caster or of the superstructure carried by it is at all times secured and liability of breakage avoided. The construction, also, is of such character that the friction between the parts is reduced to almost the minimum, from the fact that all the surfaces are curved or spherical and cylindrical. The rolling-surface of the caster is divided into two equal sections $g\ g'$, in order that one may move independently of the other, and thus a greater ease of movement secured than would be the case if a single broad-surfaced roller were used.

What I claim as my invention, and desire to secure by Letters Patent, is—

1. The combination of the divisible ball-bearing formed of a complete semi-spherical upper section and a lower centrally-perforated semi-spherical section united by screw-threads on the sections, the ball having a depending stem, a key and a caster-wheel-bracket seat for the lower section of the ball-bearing, the said seat being centrally perforated, and the stem of the ball, which is passed through the lower section of the ball-bearing and through the concave bracket-seat keyed to the bracket, substantially as described.

2. The combination of the two-part or divisible ball-bearing having semi-spherical bearing-surfaces, one of said parts having means of attachment to the furniture and a roller-bearing ledge and the other provided with a central passage, a ball having a depending stem, a caster-wheel bracket having a perforated concave seat, rollers, and a key, substantially as described.

In testimony whereof I hereunto affix my signature in presence of two witnesses.

WILLIAM IMBT.

Witnesses:
  HENRY J. KOTZ,
  JNO. B. WILLIAMS.